Feb. 17, 1925.
C. H. YOUNG
1,526,577
CORD SECURING DEVICE
Filed Aug. 18, 1921
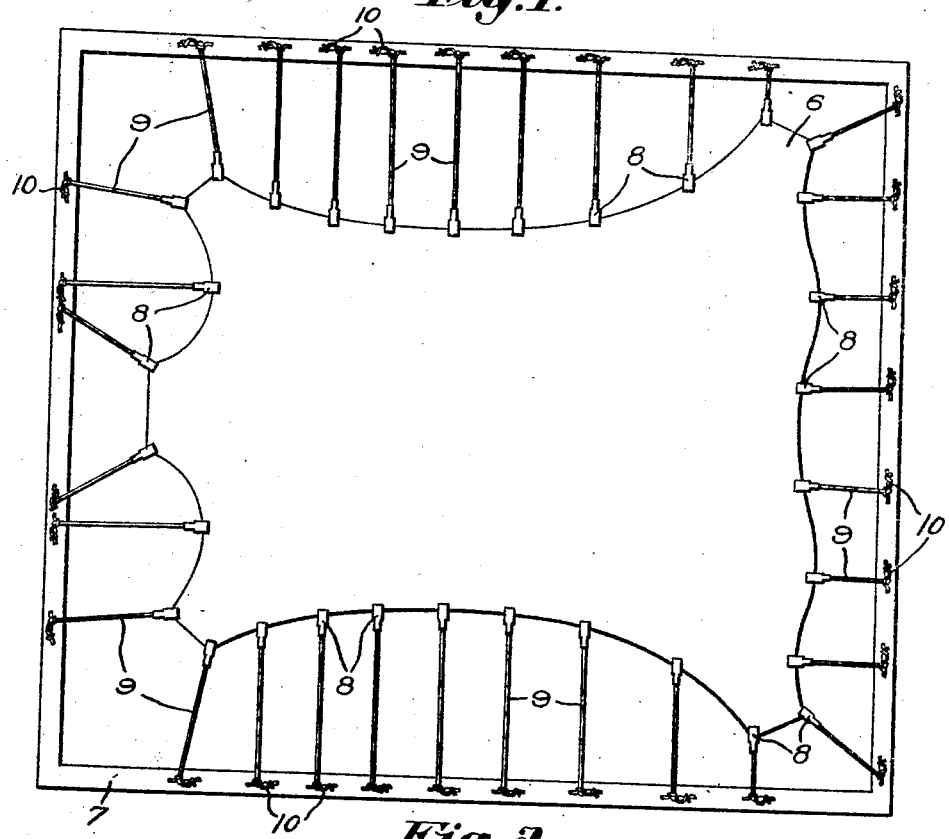
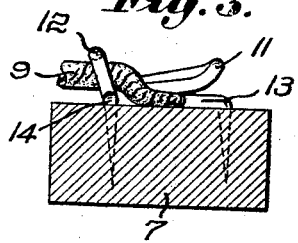
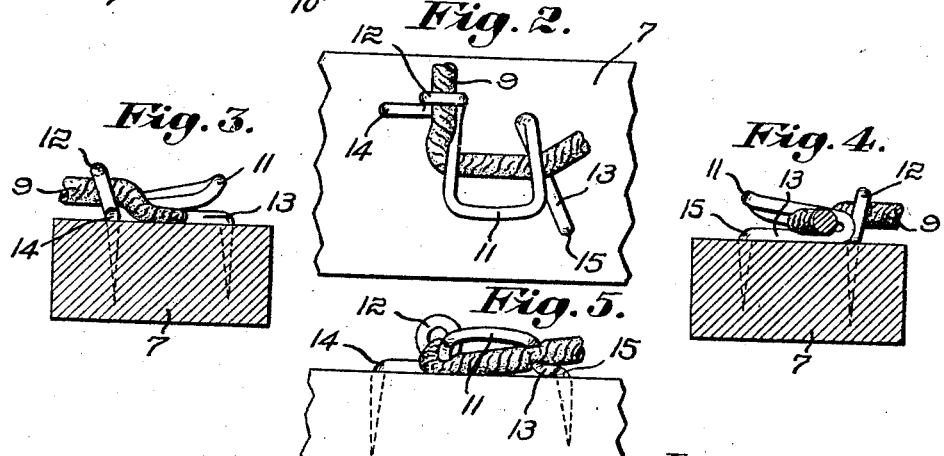
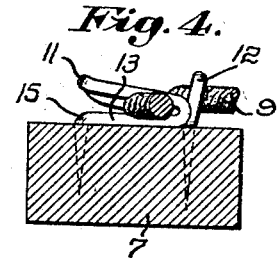
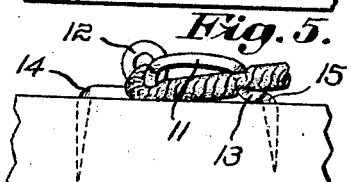
Inventor:
Clarence H. Young,
by Emery Booth Janney Varney
Attys.

Patented Feb. 17, 1925.

1,526,577

UNITED STATES PATENT OFFICE.

CLARENCE H. YOUNG, OF BOSTON, MASSACHUSETTS.

CORD-SECURING DEVICE.

Application filed August 18, 1921. Serial No. 493,360.

*To all whom it may concern:*

Be it known that I, CLARENCE H. YOUNG, a citizen of the United States, and a resident of Boston, in the county of Suffolk and State of Massachusetts, have invented an Improvement in Cord-Securing Devices, of which the following description, in connection with the accompanying drawings, is a specification, like characters on the drawings representing like parts.

This invention pertains to a cord securing device and is particularly though not exclusively useful in connection with the stretching of hides. It is among the objects of the invention to provide a simple apparatus whereby time may be saved in connection with stretching operations.

In the drawings, which show a preferred form of one embodiment of my invention:—

Figure 1 is a plan view of a preferred form of hide-stretching apparatus;

Fig. 2 is a plan view showing on an enlarged scale a preferred form of securing device for adjustably attaching flexible elements such as cords and the like;

Fig. 3 is a side elevation taken from the left of Fig. 2;

Fig. 4 is a side elevation taken from the right of Fig. 2; and

Fig. 5 is an end elevation as viewed from the bottom of Fig. 2.

Referring to the drawings and to the preferred form of my invention selected for illustrative purposes, I have shown a hide 6 stretched on a frame 7 by hide gripping clamps 8, to which are attached flexible tension elements typified by the cords 9, the latter being secured to the frame by securing means which, in the preferred form of my invention, includes gripping means, preferably resilient, and taking the form of wire cleats 10 under which the cords 9 may be passed, the cleats 10, as illustrated, preferably being of wire bent to provide an overhanging cord-gripping portion 11 resiliently to grip the cords 9 when passed therethrough.

In the preferred form of my construction illustrated, the wire forming each cleat is preferably bent to provide not only the cord-gripping means 11, but leading means typified by the eye portion 12 located laterally of the gripping portion 11 and preferably slightly in advance thereof so that the cord 9 may pass from the clamp 8 through the leading means or eye portion 12 and thence under the clamping means 11, which as illustrated preferably presents two portions of the wire sloping downwardly from the entering end so as to press the cord as it is laid therebetween. In the preferred form of my invention illustrated, the cord at the side opposite the leading means 12 is led rearwardly at 13 so that the wire underlies as well as overlies the cord at this side of the cleat. At the other side of the cleat, the cord may be pressed against the surface of the frame 7. The cleat, when formed of wire in accordance with the preferred form of my invention illustrated, is preferably made in one piece and provided with down-turned ends 14 and 15, which may be, as illustrated, sharpened so that they may be readily driven into the wood of which the frame 7 is formed. The eye 12 permits the cord-gripping portions of the cleat to operate effectively notwithstanding variations in the direction of strain on that portion of the cord which grips the hide and where the opposite end of the cord is knotted, prevents loss of the cords and clamps carried thereby, this because the toggle or clamp on one end of the cord and the knot on the other end cannot pass through the eye member 12.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A securing device for cords formed of wire presenting adjacent one end thereof a forwardly projecting portion, an upwardly and rearwardly bent portion and a gripping portion overlying said first-named portion to present in cooperation therewith converging cord-gripping surfaces, said securing device presenting adjacent the opposite end thereof an eye portion permitting passage of the cord therethrough and adjacent said eye member a second gripping portion providing with the surface on which said device is carried cord-gripping surfaces, said gripping portions centrally connected to provide an upstanding lip for facilitating entrance of said cord between said cord-gripping surfaces.

2. A securing device for cords formed of wire presenting adjacent one end thereof a forwardly projecting portion, an upwardly and rearwardly bent portion and a gripping portion overlying said first-named portion to present in cooperation therewith converging cord-gripping surfaces, said securing device presenting adjacent the opposite end thereof an eye portion permitting passage of the cord therethrough and adjacent said eye portion a second gripping portion providing with the surface on which said device is carried cord-gripping surfaces, said securing device formed from a single piece of wire and presenting terminal portions bent downwardly for fastening said securing device to a wooden carrying element.

3. A securing device for cords adapted to be mounted on a wooden carrying element and presenting three portions in contact with said wooden carrying element, one of said portions adjacent each end of the device and the third intermediate the other two portions, a cord-leading eye at one side of said intermediate point of contact and cord-gripping means on the opposite side of said intermediate point of contact.

In testimony whereof, I have signed my name to this specification.

CLARENCE H. YOUNG.